T. W. LION.
Process and Apparatus for the Manufacture of Illuminating Gas.

No. 167,844. Patented Sept. 21, 1875.

Witnesses: Donn Twitchell, A. S. York

Inventor: T. W. Lion, By his attys Dodge & Son

UNITED STATES PATENT OFFICE.

THOMAS W. LION, OF BRENTSVILLE, VIRGINIA.

IMPROVEMENT IN PROCESSES AND APPARATUS FOR THE MANUFACTURE OF ILLUMINATING-GAS.

Specification forming part of Letters Patent No. 167,844, dated September 21, 1875; application filed July 10, 1875.

*To all whom it may concern:*

Be it known that I, THOMAS WILLIAM LION, of Brentsville, in the county of Prince William and State of Virginia, have invented certain Improvements in Processes and Apparatus for Manufacturing Illuminating-Gas, of which the following is a specification:

My invention relates to a novel process and apparatus for producing a fixed hydrocarbon gas, suitable for illuminating and heating purposes.

The process consists, essentially, in the decomposition or disintegration of highly-heated hydrocarbon vapor by means of electricity, the details of the process being modified according to the quality of the gas required.

In carrying out my process I ordinarily proceed in the following manner: I first generate separately superheated steam and a highly-heated vapor of naphtha or other carbonaceous material, and then introduce the two into a heated chamber containing laminated charcoal or other form of carbon and a voltaic battery, the latter being charged with common salt, (chloride of sodium,) which is rendered active by the absorption of moisture from the vapors. By the action of the electricity the vapors are decomposed and caused to combine, in such manner that a dry, clear, and highly-inflammable gas results therefrom. The quality of the gas is improved by the decomposition and admixture of the salt under the combined influences of the heat, moisture, and electricity. In order to still further improve the quality of the gas, I pass it into a second chamber, containing a thermo or other suitable battery. When it is required to have the gas very rich in carbon it is passed through a superheater, and then through a carbureter.

Figure 1:
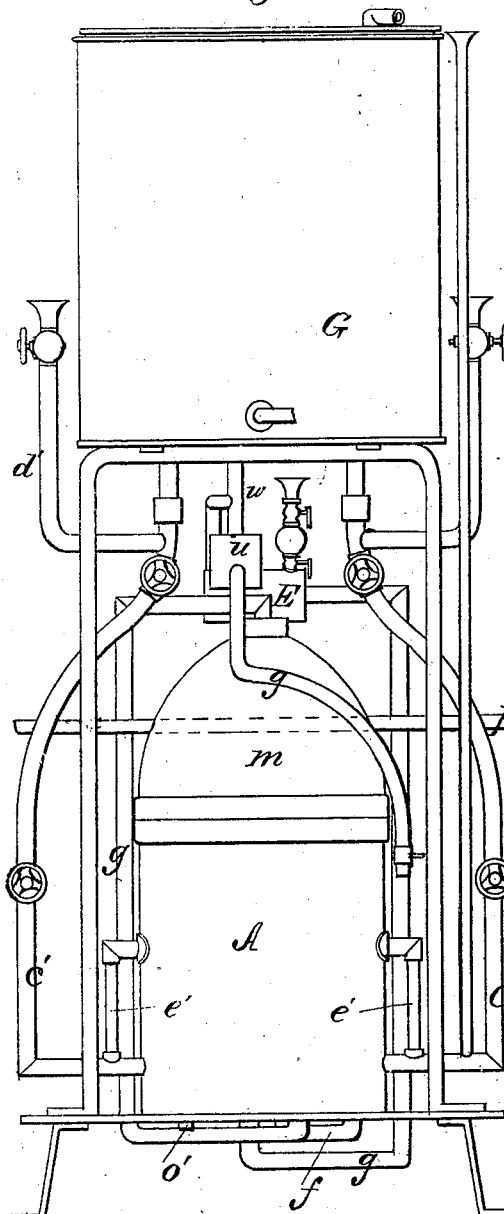
Figure 2:
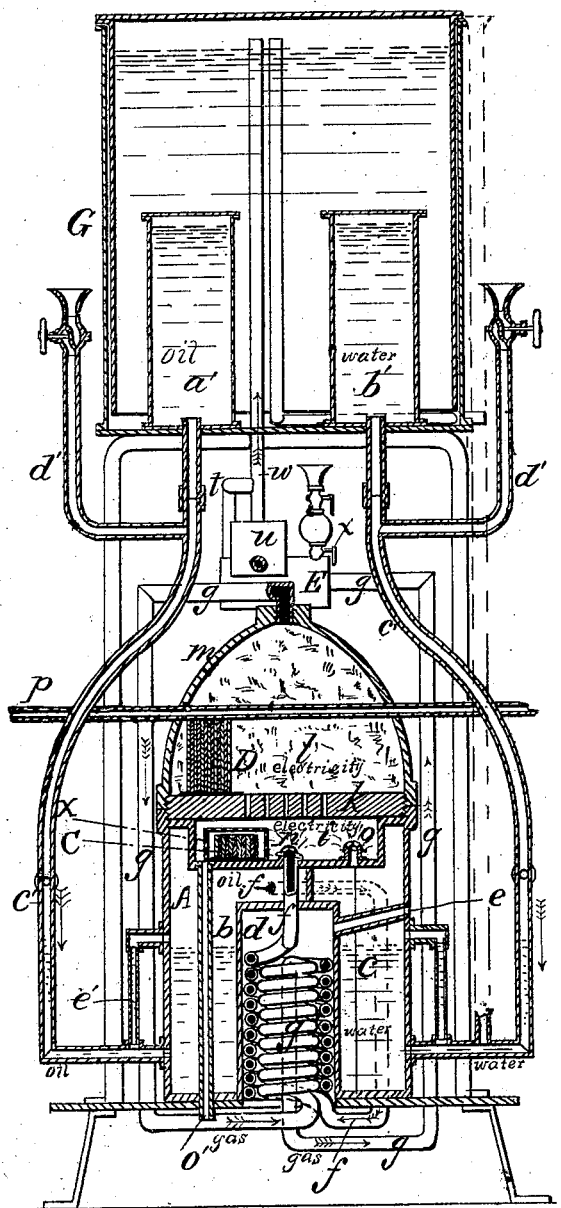
Figure 3:
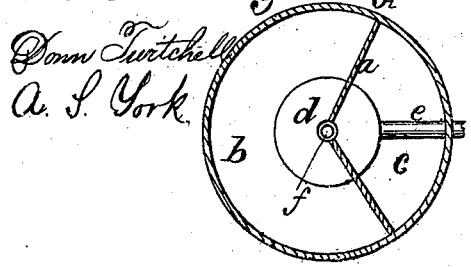
Figure 4:
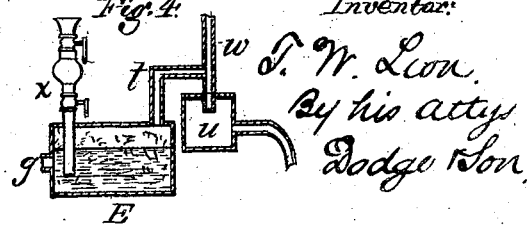

Figure 1 represents a side elevation of my complete apparatus; Fig. 2, a vertical central section of the same; Fig. 3, a horizontal section of the same; Fig. 4, a vertical section of the carbureter.

A represents a hollow cylindrical retort, divided by a vertical partition, $a$, into two separate chambers, $b$ and $c$, as represented in Figs. 2 and 3, the chamber $b$ being made double the capacity of the chamber $c$, and intended to receive water, while the chamber $c$ is to receive the carbonaceous material. In the lower end of the retort there is formed a central fire-chamber, $d$, having at its upper end one or more flues, $e$, leading out through the side of the retort, to carry off the products of combustion. In the chamber $d$ there are mounted, one within the other, two superheating-coils, $f$ and $g$, the former for the steam, and the latter for the gas passing to the carbureter, as hereinafter more fully explained. There will also be arranged at the bottom of the chamber $d$ a fire-grate or a gas-burner, so that the one fire or flame will serve to heat both chambers of the retort and both superheaters. On the top of the retort there is formed a mixing-chamber, $i$, the top of which is closed by a perforated plate, $k$, above which latter there is a second chamber, $l$, within a conoidal or bell-shaped hood, $m$, which is secured firmly and tightly to the plate, as shown. The outer superheating-coil $f$ has one end introduced into the top of the water-chamber $b$, and the other end passed up through the top of the retort into the mixing-chamber $i$, where it terminates in a perforated head or rose, $n$, as shown in Fig. 2.

In the chamber $i$ there is also a second perforated head or rose, $o$, communicating with the top of the carbon-chamber $c$, as shown. In the mixing-chamber $i$ there is located a voltaic battery, C, which is arranged in a wire-gauze basket, X, upon suitable insulators, and charged with common table-salt, and provided with platinum conductors. The chamber is filled around the battery with laminated charcoal, graphite, or other form of carbon, which should be as pure as possible. From the chamber a pipe, $o'$, is also extended down through the bottom of the retort to carry off any fluids resulting from condensation, the fluid being discharged into a suitable receptacle, or conducted directly to the water-chamber of the retort to be again vaporized, as preferred. In the upper chamber $l$ there is located a thermo-battery, D, composed as usual of alternate strips of antimony and bismuth, supported by insulators, and provided with copper conductors having platinum tips.

In order to excite the battery to action its upper end is arranged in contact with or close proximity to a pipe, p, which is passed transversely through the chamber and filled with cold water or any other suitable cooling fluid or compound. The space in the chamber around the battery is filled with sponge or other like porous material. From the top of the chamber the superheater-pipe g extends downward to the coil, as shown. From the top of the coil the pipe passes down through the center, as shown in Fig. 2, and thence to a carbureter, E, consisting simply of a horizontal cylinder stuffed with sponge and filled to its middle with naphtha, oil, or other suitable fluid. The inlet-pipe g enters the cylinder at one end below the surface of the fluid, while the outlet-pipe t leaves the cylinder at the opposite end and from its top, as clearly shown in Fig. 4. The pipe t conducts the gas into the upper part of a drip-cup or chamber u, from the top of which a pipe, w, passes up into a gasometer, G, located at the top of the apparatus.

In order that the carbureter may be readily charged while in operation it is provided with an upright supply-pipe, x, provided with a funnel-mouth, a spherical chamber below the same, and cocks above and below the chamber, as shown in Fig. 4. The lower cock is first closed and the upper one opened, and then the fluid introduced into the chamber, after which the upper cock is closed and the lower one opened, permitting the fluid to pass down into the cylinder.

For the purpose of supplying the chambers of the retort with the water and carbonaceous fluid, I immerse in the water in the gasometer two vessels or reservoirs, $a'$ and $b'$, and connect the same by pipes $c'$, provided with cocks, with the respective chambers, as shown in Fig. 2. Each of the last-mentioned pipes is provided with a branch arm, $d'$, having a funnel-mouth and a stop-cock, through which the reservoirs may be refilled. Each of the chambers of the retort is provided with a glass gage, $e'$, to show the height of the fluid therein.

The operation of the apparatus is as follows: The two chambers of the retort being filled to the proper height with water and oil, respectively, a fire is started in the chamber d, and the fluids vaporized. The steam resulting from the vaporization of the water in the chamber b passes through the pipe g, and after being superheated in the coil thereof escapes from the rose n into the mixing-chamber i, where it meets the carbon vapor escaping through the rose o from the chamber c. The two vapors, being acted upon by the electricity, combine in such manner as to form a clear, dry, fixed gas, of a highly inflammable nature, the quality of the gas being improved by the admixture during the process of the vapors resulting from the decomposition of the salt with which the battery is charged. The gas produced as above in the mixing-chamber escapes through the perforations in the plate k into the upper chamber l, where it is acted upon by the electricity generated by the thermo-battery D, after which it is passed through the superheater and the carbureter, and thence to the gasometer.

The object of using the second battery is to purify the gas and improve its quality, and to insure the fixedness of the same in the event of the first electrical action being imperfect as may sometimes be the case. The second battery may be dispensed with, and the gas passed directly to the carbureter, or the two batteries employed without the carbureter, or the second battery and the carbureter both dispensed with. The carbonaceous material may be of any suitable character, such as spirits of turpentine, linseed, lard, olive, sperm or fish oil, coal-oil, or petroleum, or any of its products.

Instead of employing the thermo-battery in the upper chamber a battery of other construction may be used, and so too in the mixing-chamber a battery of any desired character may be used. The only requirement is that the vapors and gas shall be subjected to the action of electricity, and the arrangement shown is adopted merely because of its convenience. While the apparatus shown is considered the best that can be devised for carrying out my process, it is obvious that any other suitable apparatus may be employed for the purpose.

Having described my invention, what I claim is—

1. The process of manufacturing illuminating-gas, consisting in subjecting highly heated hydrocarbon vapor to the action of electricity, substantially as described.

2. The process of manufacturing illuminating-gas, consisting in subjecting heated hydrocarbon vapor to the action of electricity to produce a fixed gas, and then subjecting said gas to the action of electricity, substantially as described.

3. The process of manufacturing illuminating-gas, consisting in subjecting heated hydrocarbon vapor to the action of electricity, and then passing the resultant gas through a carbureter, substantially as shown and described.

4. The mixing-chamber i, containing the insulated electric battery C and laminated charcoal or its equivalent, and supplied with superheated-steam and carbon-vapor inlets, substantially as described.

5. The cylindrical retort A, divided into the two chambers b and c, and provided with the central fire-chamber d containing the superheating-coils, as shown.

6. The cylindrical retort A, divided into the chambers b and c, in combination with the chamber i communicating with the two chambers of the retort, and containing the electric battery and charcoal, substantially as shown and described.

7. The combination of the battery C charged with salt, the gauze-basket X, and hydrocarbon-vapor chamber, as and for the purpose described.

8. The combination of the retort, containing two separate chambers, the mixing-chamber $i$, communicating with the chambers of the retort and containing the electric battery, and the chamber $l$ communicating with the mixing-chamber and containing a thermo-battery.

9. The combination of the retort A, provided with chamber $i$, the perforated plate $k$, and the hood $m$, as shown.

THOMAS WM. LION.

Witnesses:
  W. C. DODGE,
  P. T. DODGE.